United States Patent [19]
Grasset

[11] Patent Number: 5,304,793
[45] Date of Patent: Apr. 19, 1994

[54] LIGHT SIGNAL RECEIVER WITH PREAMPLIFICATION FUNCTION AND DUAL POLARIZATION MEANS

[75] Inventor: Jean-Charles Grasset, Fontaine, France

[73] Assignee: Thomson Composants Militaires et Spatiaux, Courbevoie, France

[21] Appl. No.: 983,369

[22] Filed: Nov. 30, 1992

[30] Foreign Application Priority Data

Nov. 29, 1991 [FR] France ................. 91 14812

[51] Int. Cl.$^5$ ............................................. H01J 40/14
[52] U.S. Cl. ................................ 250/214 A; 330/59; 359/189
[58] Field of Search ....... 250/214 R, 214 A, 214 AG; 330/59, 308; 359/189, 185, 193, 194, 195; 307/311

[56] References Cited

U.S. PATENT DOCUMENTS

| | | |
|---|---|---|
| 4,139,767 | 2/1979 | Witkowicz . |
| 4,750,217 | 6/1988 | Smith et al. ............. 250/214 A |
| 5,113,151 | 5/1992 | Yamamoto et al. ......... 250/214 AG |

FOREIGN PATENT DOCUMENTS

0409259A2  1/1991  European Pat. Off. .
2720614A1 11/1978  Fed. Rep. of Germany .

OTHER PUBLICATIONS

Patent Abstracts of Japan vol. 14, No. 213 (E-923) May 7, 1990 & JP-A-2 050 534 (Fukushima Shiyouya) Feb. 20, 1990.
Patent Abstracts of Japan vol. 11, No. 32 (P-541) Jan. 30, 1987 & JP-A-61 202 124 (Canon) Sep. 6, 1986.

*Primary Examiner*—David C. Nelms
*Assistant Examiner*—Que T. Le
*Attorney, Agent, or Firm*—Oblon, Spivak, McClelland, Maier & Neustadt

[57] ABSTRACT

A light signal receiver in which an input of a preamplifier receives a so-called useful electric current output by a light-sensitive device. The preamplifier comprises an input stage having an input transistor assembled with a "common base" whose emitter is connected to the input of the preamplifier and whose base is kept at a fixed potential. A low input impedance and therefore a reduction of the influence of stray capacitance exhibited by the light-sensitive device results from this arrangement Further, a second input transistor can be utilized so that the preamplifier operates as a differential type preamplifier.

15 Claims, 3 Drawing Sheets

LIGHT SIGNAL RECEIVER WITH PREAMPLIFICATION FUNCTION AND DUAL POLARIZATION MEANS

BACKGROUND OF THE INVENTION

1. Field of the Invention

The present invention is directed to devices for receiving light signals, in particular (but not exclusively) signals transmitted by optical fiber and which are converted into electric signals by a photodiode of the PIN type. More particularly, the present invention is directed to preamplifiers of the transimpedance type intended to amplify such electric signals.

2. Discussion of the Background

By taking as an example a case of the transmission of data by optical fiber, FIG. 1 diagrammatically illustrates the use of this technique.

As shown in FIG. 1, data is transmitted in the form of light signals by an optical fiber 1 to a receiver 2. Receiver 2 comprises a light-sensitive device 3 and an amplifier, or more precisely a preamplifier 4. Light-sensitive device 3 converts the light signals into electric signals which are applied to the input of preamplifier 4. The corresponding output electric signals, delivered by preamplifier 4, are then transmitted to an acquisition device 5 to be processed.

Light-sensitive device 3 can be formed of, for example, a phototransistor or a photodiode, and very often it is formed of a photodiode of the PIN type. When photodiode 3 is formed of a PIN type photodiode, photodiode 3 is back-biased, and it can be considered as low level, like a current generator shunted by a stray capacitance CP, as shown by the dotted lines in FIG. 1. It should be noted that the light-sensitive element 3 can be of any type since it is inserted in a circuit making it possible to produce a current generator producing a current i reflecting the light signals received.

Since preamplifier 4 is at the head of the receiving chain, its characteristics largely determine the overall performances of receiver 2. It is generally desired for preamplifier 4 to have sufficient (often considerable) gain with a wide passband and an equivalent low noise brought as an input to cause as little deterioration as possible to the intrinsic sensitivity of the sensor, i.e., the light-sensitive element 3. Preamplifier 4 is of the transimpedance type, in which gain Z is provided by the ratio of output voltage VS to input current i delivered by light-sensitive element 3 (Z=VS/i).

Transimpedance preamplifiers are currently used to amplify signals delivered by photodiodes of the PIN type (P conductivity, intrinsic, N conductivity); the description of such a preamplifier is found in particular in an article by Robert G. Meyer and Robert Alain Blauschild "A Wide-Band Low-Noise Monolithic Transimpedance Amplifier" published in IEEE Journal of Solid-State Circuits, Vol. SC-21, No. 4, Aug. 1986, pages 530 to 533.

FIG. 2 diagrammatically shows the basic circuit according to which, in the prior art, transimpedance preamplifiers are joined to a PIN photodiode, and in the case in particular where the PIN photodiode receives signals transmitted by an optical fiber.

Photodiode 3 is represented in the form of a current generator (shunted by stray capacitance CP). Amplifier 4 is a large-gain wide-band voltage amplifier, with negative feedback by a resistance R. Light-sensitive element or current generator 3 is connected to the negative input "−" of the amplifier 4.

The circuit shown in FIG. 2 constitutes a basic circuit broadly described with different optimizations. But in all cases, one of the significant problems in such a circuit resides in the difficulty that there is in obtaining a fairly wide passband BW (required by a high data flow) while maintaining a sufficient phase margin to assure a good stability of the amplifier 4.

It should be noted that the frequency response of the circuit illustrated in FIG. 2 is largely governed, on the one hand, by the stray capacitane CP of the PIN diode, and on the other hand, by an input capacitance CR of the amplifier (this capacitance CR is represented by the dotted lines as being a stray capacitance associated with negative feedback resistance R). A very great sensitivity of the passband, and therefore of the stability, to the value of 5 stray capacitance CP of the PIN diode results from this. This detail is particularly troublesome when it is desired to construct as universal a preamplifier as possible available, i.e., a preamplifier which is able to operate with various types of light-sensitive elements and therefore with various values of stray capacitance CP.

More precisely, passband BW of the amplifier also depends on stray capacitance CR of resistance R, as indicated in the following equation:

$$BW = \tfrac{1}{2} \mathbf{q} \, (CR \cdot R + CP \cdot R/G) \tag{1}$$

where G is the gain of the amplifier.

Now, in practice, stray capacitance CR reduces the potential passband, and this all the more so since, according to a general step, it is desired to increase R to minimize the noise brought back as an input.

It should be noted that another drawback of a preamplifier stage produced using an amplifier as illustrated in FIG. 2 is that to keep the effectiveness of the negative feedback as far away as possible in frequency, it is desired to make the output impedance of this amplifier very low, which is achieved at the cost of a large consumption of current on the output followers (not shown) that such an amplifier comprises in a standard way.

SUMMARY OF THE INVENTION

Accordingly, one object of the present invention is to provide a novel preamplifier structure which overcomes the drawbacks of the conventional preamplifier circuits.

To overcome the drawbacks cited above, the present invention proposes associating a light-sensitive element, such as a photodiode of the PIN type for example, with at least one preamplifier stage formed by a bipolar transistor of a polarized type with a common base, the input of the preamplifier being the emitter of this bipolar transistor.

One of the advantages of such an arrangement results from the absence of negative feedback around this stage, hence the absence of risks of synchronization due to a possible insufficiency of phase margin. There is therefore a widening of the useful passband As a further benefit, in a circuit of this type, the input impedance is kept very low so that the stray capacitances (and, among others, the stray capacitance of the light-sensitive element) do not alter the intended frequency response.

In a simplified embodiment of the present invention, these advantages are obtained by keeping noise performances comparable to those obtained with the standard solutions. However, the present invention lends itself particularly well to being used in a simple way in a circuit of the differential type, and in this case, it makes it possible to improve the signal/noise ratio.

The present invention therefore relates to a device for receiving light signals, comprising a light-sensitive device delivering a so-called "useful" electric current signal in response to the received light signals, a preamplifier of which having at least one input that receives the useful current, the preamplifier comprising at least one input transistor. An electrode of the input transistor is connected to the input of the preamplifier. The preamplifier further comprises at least one polarization means connected to the base of the input transistor to impose a fixed potential on this base.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE INVENTION

Figure 3:
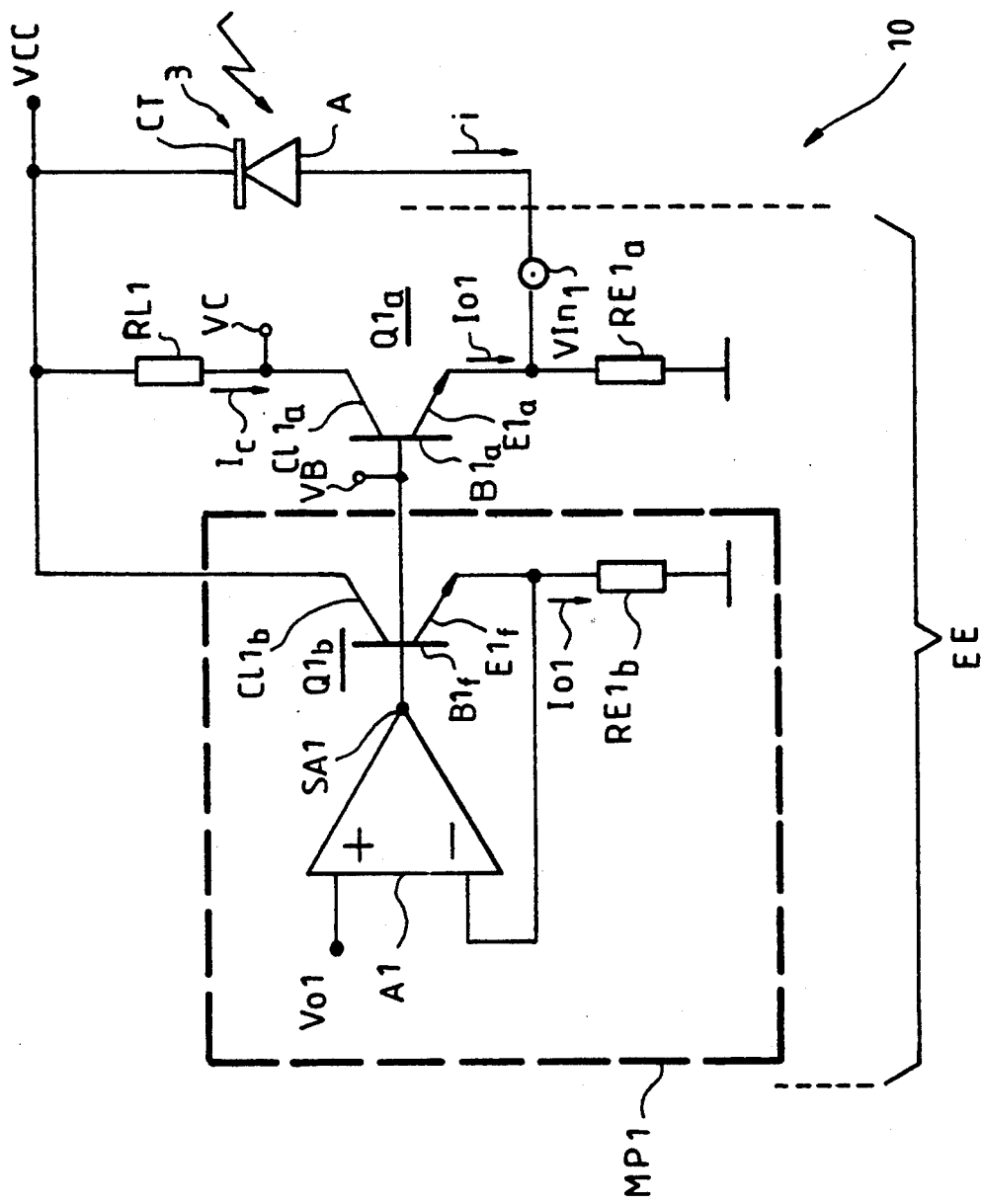
FIG. 3 diagrams a simplified version of a preamplifier stage according to the present invention.

Referring now to the drawings, wherein like reference numerals designate identical or corresponding parts throughout the several views, and more particularly to FIG. 3 thereof, there is shown a preamplifier circuit of the present invention.

Figure 1:
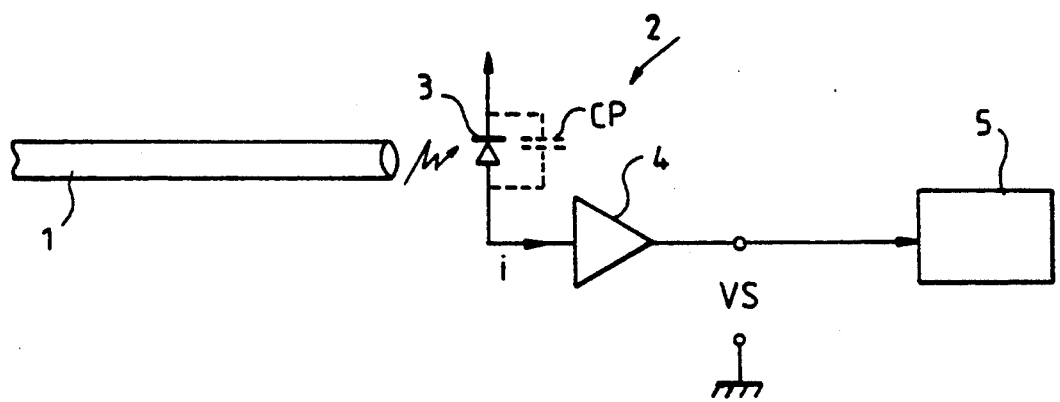
FIG. 1, already described, illustrates the technique of the transmission of data by an optical fiber.
Figure 2:
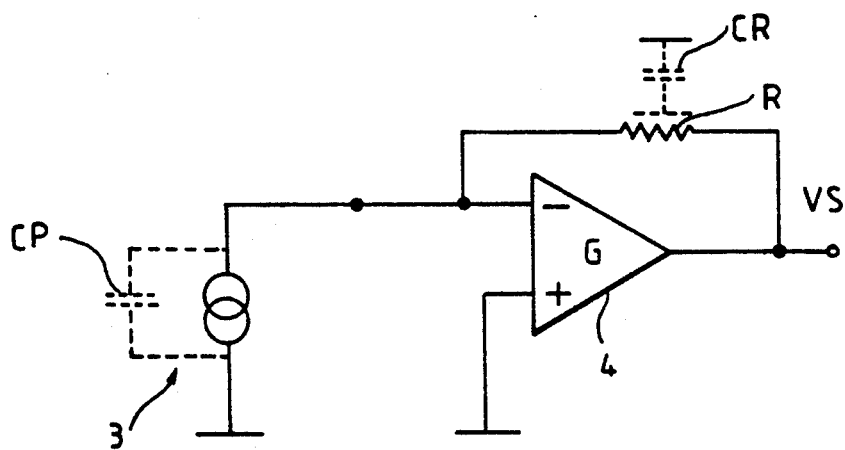
FIG. 2, already described, represents a standard preamplifier stage of a light signal receiver.

FIG. 3 shows a preamplifier 10 according to the present invention, used in a receiver for light signals transmitted, for example, by an optical fiber (not shown) as in the example of FIG. 1. The receiver is partially represented by preamplifier 10 and by a light-sensitive device 3 which functions to convert the light signals received into electric signals.

In the non-limiting example shown in FIG. 3, light-sensitive device 3 is represented in the form of a photodiode (for example, a photodiode of the PIN type), but as has already been indicated above, other light-sensitive elements can be used, the important point being to obtain a useful current i proportional to the light signals received or linked to the light signals by a known law.

According to a characteristic of the present invention, preamplifier 10 features an input stage comprising an input transistor $Q1_a$ of the bipolar type, polarized according to a circuit of the common base type, and launched in current by light-sensitive element 3. In the nonlimiting example, input transistor $Q1_a$ is of the NPN type and an input $VIn_1$ of the input stage of the preamplifier, i.e., the point of the preamplifier 10 to which light-sensitive element 3 is connected, is located on emitter $E1_a$ of input transistor $Q1_a$.

The preamplification of the input electric signals delivered by light-sensitive element 3, i.e., of the input electric current, is assured by input transistor $Q1_a$, whose collector $Cl1_a$ delivers output signals corresponding to the amplified input signals in the form of the current $I_c$ which flows into a load resistance RL1. For this purpose, collector $Cl1_a$, is connected by load resistance RL1 to a positive feed potential VCC. Positive feed potential VCC has a potential of +5 volts, for example, relative to the potential of the ground to which emitter $E1_a$ is connected by an emitter resistance $RE1_a$.

Photodiode 3 is back-biased and its anode A is connected to emitter $E1_a$ of input transistor $Q1_a$ and its cathode CT is connected to positive feed +VCC.

Input transistor $Q1_a$ is polarized so as to determine its emitter zero signal current Io1, by keeping the voltage on its base $B1_a$ fixed. For this purpose, in addition to emitter resistance $RE1_a$, preamplifier 10 comprises polarization means MP1 (shown in a box of dotted lines) comprising, in the example shown, an operational amplifier A1 and a second bipolar transistor $Q1_b$ of the same type as input transistor $Q1_a$. More precisely, transistors $Q1_a$ and $Q1_b$ are paired so that, subjected to the same conditions, they act in the same manner.

The positive input "+" of operational amplifier A1 is connected to a reference voltage Vo1 between the ground and positive feed potential VCC. Output SA1 of amplifier A1 is connected both to base $B1_b$ of second transistor $Q1_b$ and to base $B1_a$ of input transistor $Q1_a$. The negative input "−" of the operational amplifier A1 is connected to emitter $E1_b$ of second transistor $Q1_b$; the emitter $E1_b$ is grounded by a second emitter resistance $RE1_b$. Finally, collector $Cl1_b$ of second transistor $Q1_b$ is connected directly to positive feed +VCC. It is also possible to arrange for the collector static potential of second transistor $Q1_b$ to be brought to a value close to that of the potential to which the collector of input transistor $Q1_a$ is brought, for example, by inserting a resistance (not shown) in series with the collector $Cl1_b$ of second transistor $Q1_b$.

Under these conditions, the amplifier comprised of operational amplifier A1 and second transistor $Q1_b$ has a gain of 1, so that reference voltage Vo1 applied to the positive input "+" of operational amplifier A1 is found on emitters $E1_a$ and $E1_b$ of respective $Q1_a$ and $Q1_b$.

It is noted that thus light-sensitive diode 3 is well back-biased.

By assuming that reference voltage Vo1 has, for example, a value of 3 volts and if, for example, a value of 6,000 ohms is given to each of the two emitter resistances $RE1_a$, $RE1_b$, and transistors $Q1_a$ and $Q1_b$ being identical, they each have an emitter zero signal current Io1 equal to 0.5 mA, i.e., the current in the emitter resistances is set at 0.5 mA. Collector current $I_c$ being almost equal to the emitter current (since the basic current is weak, it is disregarded), potential VC of the collector, at zero signal (on $Q1_a$), is equal to feed potential VCC reduced by the product of zero signal current Io1 and load resistance RL1 or VCC −(RL1×Io1); this corresponds to a collector voltage VC of +4.25 V if a value of, for example, 1,500 ohms is given to load resistance RL1.

Photodiode 3 exposed to an illumination, i.e., receiving the data in the form of light signals, acts as a current generator and delivers a useful current i. In an ordinary way, useful current i can have a value between, for example, 0.5 microamperes and 300 microamperes, and whose variations are reflected in a manner approximately proportional to the level of collector voltage VC.

Potential VB on the base of input transistor $Q1_a$ is fixed and it does not vary regardless of the variations of useful current i (it can be useful for this purpose to place a capacitance (not shown) between base $B1_a$ and ground, for example). Consequently, since the potential on emitter $E1_a$ of input transistor $Q1_a$ is almost fixed also at the value of reference voltage Vo1, this imposes in emitter resistance $RE1_a$ a fixed and constant current equal to $Vo1/RE1_a$.

As a result, when photodiode 3 delivers a useful current i, zero signal current Io1 pertaining to the input transistor is modified proportionately by it, i.e., collector current $I_c$ decreases by a value approximately equal to that of useful current i. A positive variation of voltage VC in collector $C11_a$ a results from this. For example, the appearance of a useful current i of 20 microamperes is reflected by a positive variation of 0.03 volts (if RL1=1,500 ohms), and a useful current of 300 microamperes produces a positive variation of 0.450 volts.

A circuit of the input stage of a preamplifier as described above is particularly advantageous by the fact that the stage does not have negative feedback which tends to widen the useful frequency band.

On the other hand, the input impedance expressed by the relation Ut/IE being kept very low, the time constant $Ut/IE \times (CP+Cbe)$ does not alter the intended frequency response; Ut being equal to KT/q, where K is the Boltzmann constant; T is the absolute temperature; q is the charge of an electron (Ut being equal to approximately 26 mV at 25° C.); IE being the emitter current; CP being the stray capacitance of photodiode 3; Cbe being the base-emitter capacitance (not shown). In fact, it is almost possible to arrange for the only limitation in frequency to be given by time constant $R_L - C_o$ where $R_L$ is the load resistance and $C_o$ is the stray capacitance (not shown) seen on the output node of the preamplifier.

The input dynamics are a function only of the sensitivity and of the reserve of dc voltage available on the collector of input transistor $Q1_a$. It should be noted that tests performed with a circuit according to the present invention showed the possibility of obtaining dynamics of useful current i on the order of 1000 with VCC =5 volts.

Figure 4:
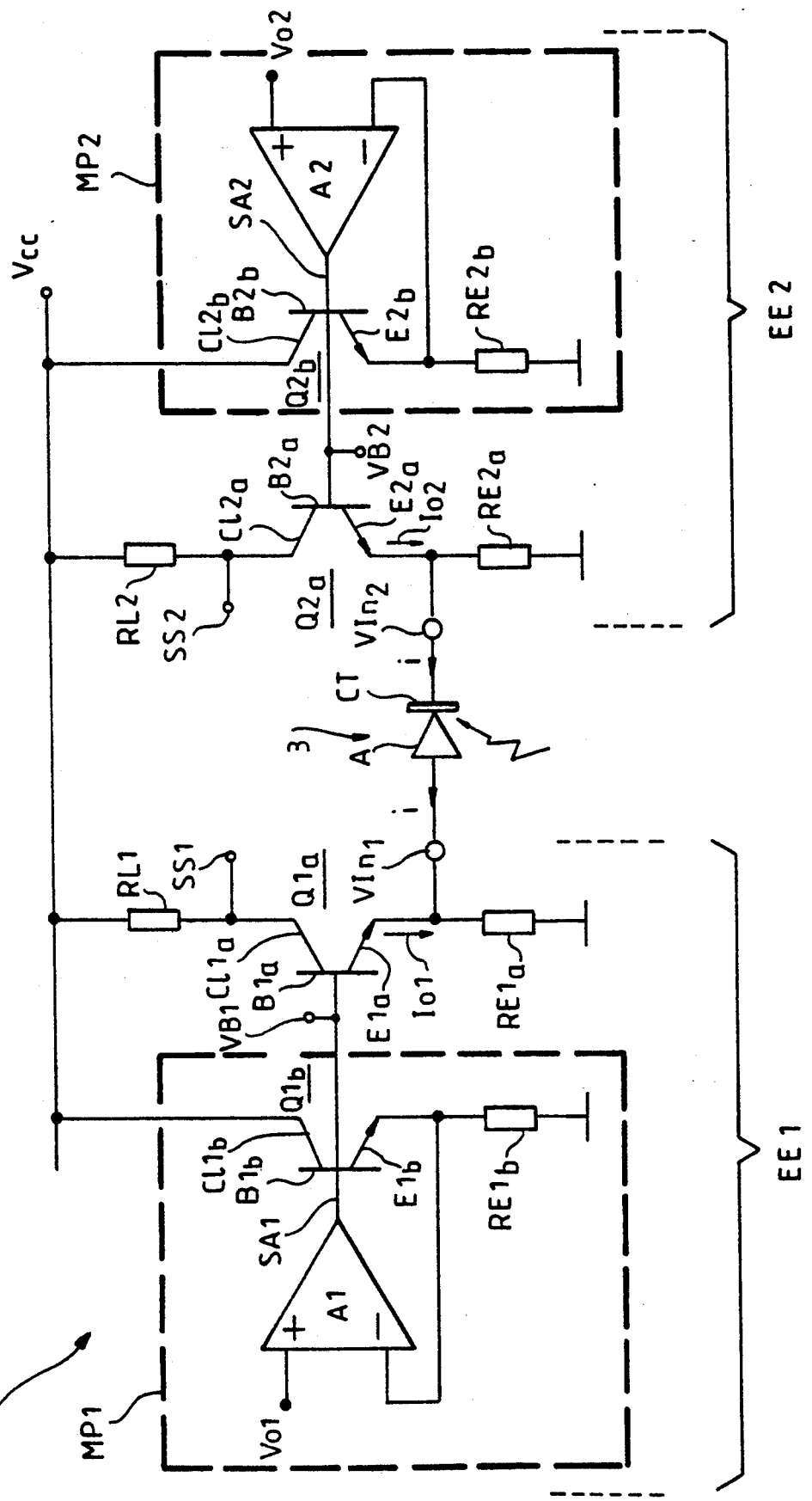
FIG. 4 diagrams a preferred version of a preamplifier stage according to the present invention.

FIG. 4 diagrams a further preferred embodiment of the present invention, in which the current generator that light-sensitive device 3 forms (itself comprised in the nonlimiting example described only by a light-sensitive diode) is read by a preamplifier 20 of the differential type, i.e., a circuit comprising two inputs each formed by an input stage of the type of that produced using input transistor $Q1_a$ shown in FIG. 3.

In FIG. 4, anode A of the photodiode is connected to emitter $E1_a$ of input transistor $Q1_a$ in the same way as in the example explained with reference to FIG. 3, and in the same way as in FIG. 3, this input transistor is connected to polarization means MP1.

These polarization means MP1 are themselves identical, with the exception, however, of the value of reference voltage Vo1 and of the values of emitter resistances $RE1_b$, $RE1_a$.

Relative to FIG. 3, the difference in the circuit shown in FIG. 4 resides in the fact that cathode CT of photodiode 3 is not connected to the positive polarity +VCC, but that is instead connected to a second input $VIn_2$ of a second input stage whose structure is in all aspects similar to that illustrated in FIG. 3. This second input $VIn_2$ is located on emitter $E2_a$ of a second input transistor $Q2_a$, which itself is of the same type as first input transistor $Q1_a$, i.e., of a bipolar NPN type in the example.

In the same way as first input transistor $Q1_a$, second input transistor $Q2_a$ is polarized with a common base by second polarization means MP2, similar to first polarization means MP1. Second polarization means MP2 comprises a second operational amplifier A2 whose positive input "+" receives a second reference voltage Vo2. Output SA2 of second amplifier A2 is connected both to the base negative feedback NPN transistor $Q2_b$; as in the device shown in FIG. 3, these two transistors $Q2_a$ and $Q2_b$ are paired. In the device shown in FIG. 4, the collector $Cl2_b$ of second negative feedback transistor $Q2_b$ is connected directly to positive feed potential +VCC, and its emitter $E2_b$ is grounded by an emitter resistance $RE2_b$. As in the case of the input stage already explained with reference to FIG. 3, the collector $Cl2_b$ of second transistor $Q2_b$ can also be connected to feed potential VCC by a resistance.

The other connections of second input transistor $Q2_a$ are the following: its collector $Cl2_a$ is connected to positive feed potential +VCC by a second load resistance RL2, and its emitter $E2_a$ is grounded by an emitter resistance $RE2_a$, this emitter $E2_a$ being further connected to cathode CT of photodiode 3.

Under these conditions, preamplifier 20 comprises two input stages EE1, EE2, each able to operate in a way similar to that already explained for input state EE comprised of first polarization means MP1 and first input transistor $Q1_a$ shown in FIG. 3 at second input $VIn_2$.

Amplifiers A1, A2 associated respectively with negative feedback transistors $Q1_b$ and $Q2_b$ have only a role of polarization while keeping potentials VB1, VB2 correct on respective bases $B1_a$ and $B2_a$ of the active transistors, i.e., of input transistors $Q1_a$ and $Q2_a$. This to impose on the latter the desired zero signal current Io1, Io2, while latter the desired zero signal current Io1, Io2, while imposing on emitters $E1_a$ and $E2_a$ (and therefore on inputs $VIn_1$ and $VIn_2$ of these transistors), different continuous potentials suited to back bias photodiode 3.

Thus, for example, first and second reference voltages Vo1, Vo2 can have respectively values of 1.5 volts and 3 volts, values that are found respectively on the first and on the second inputs $VIn_1$, $VIn_2$, and photodiode 3 is thus back-biased.

Despite this voltage shift between the two emitters of input transistors $Q1_a$, $Q2_a$, these transistors nevertheless can have a zero signal current Io1, Io2 of the same value, by giving suitable values to the emitter resistances: for example, 3,000 ohms to emitter resistances $RE1_a$ and $RE1_b$ of the first input stage EE1, and therefore a double value of 6,000 ohms for emitter resistances $RE2_a$ and $RE2_b$ of the second input stage EE2. Under these conditions, zero signal currents Io1 and Io2 produced respectively in the first and second input transistors $Q1_a$, and $Q2_a$ have the same value of 0.5 mA. Furthermore, first and second load resistances RL1, RL2 can have the same value of, for example, 1,500 ohms.

When photodiode 3 receives light signals, it reflects these received signals by a useful current i which is applied simultaneously to the two stages EE1, EE2. The presence of this useful current i creates on first input stage EE1 effects identical to those already explained with reference to FIG. 3, and it produces on second input stage EE2 effects that are similar but which have an opposite sign.

The presence of useful current i has the effect of reducing the current of the first input transistor $Q1_a$ (in the same way as in the example of FIG. 3), and on the other hand, of increasing the current of the second input transistor $Q2_a$. Actually, in the example shown in FIG. 4, useful current i which circulates in photodiode 3 is formed from a part of the emitter current of second input transistor $Q2_a$, but this part does not pass through emitter resistance $RE2_a$ and therefore does not cause the corresponding voltage drop. On the other hand, the voltage is kept fixed on base $B2_a$ of this second input transistor $Q2_a$, which has the effect of requiring an increase of the emitter current of the input transistor $Q2_a$ to maintain the current initially set in emitter resistance $RE2_a$, i.e., on second input $VIn_2$.

Thus, the appearance of a useful current i produces variations of voltage of opposite signs at respective outputs SS1, SS2 of input transistors $Q1_a$, $Q2_a$, i.e., on the collectors of transistors $Q1_a$, $Q2_a$. Considering the example shown in FIG. 4 where anode A of photodiode 3 is connected to emitter $E1_a$ of the first input transistor $Q1_a$, the appearance of useful current i creates a positive variation of voltage at an output SS1 of the first input transistor $Q1_a$, and a negative variation at an output SS2 of second input transistor $Q2_a$. Of course, the situation can be reversed, but in particular with transistors of the NPN type, it is always the input transistor which is polarized with reference voltages Vo1, Vo2 of the smallest value, which displays at an output a variation of voltage of the same sign as the variation of useful current i.

It should be noted that the embodiment of the present invention of the differential type, as explained above with reference to FIG. 4, offers considerable advantages because it makes it possible to obtain two complementary output signals SS1, SS2. These two complementary output signals make it possible "to launch" in differential following circuits of the receiving chain. There results from this all the advantages attached to a differential circuit which are, among others: an improvement of the signal/noise ratio, because the gain is increased more than the noise in the version of FIG. 4 relative to that shown in FIG. 3; and also a better rejection of the feeds often producing noise by the switchings of the outputs.

Further, the advantage of a differential configuration is decisive element of choice in regard to performances with bipolar integrated circuits with insulation by junction. Actually, in these technologies, any "single" input circuit (with single input) potentially induces risks of synchronizations, due to an input-output reaction caused by the stray access inductances (on the VCC feed) and the substrate island stray capacitance of the resistances.

The description has been given with reference to transistors of the NPN type, but the invention can also be applied in the case of transistors of the PNP type with potential distributions opposite those shown in FIGS. 3 and 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A light signal receiver comprising:
   a light-sensitive device delivering an electric current in response to detected light signals;
   a preamplifier having a first input which receives the electric current output from the light-sensitive device, the preamplifier comprising:
   at least one input transistor having an emitter connected to said first input of the preamplifier, wherein the at least one input transistor is of a bipolar NPN type;
   at least one polarization means connected to a base of the at least one input bipolar transistor to impose a fixed potential on this base;
   a collector of the at least one input transistor being connected to a first feed potential by a load resistance;
   the emitter of the at least one input transistor being further connected to a second feed potential by a first emitter resistance; and
   wherein the collector delivers voltage signals as a function of the electric current output from the light-sensitive device.

2. The light signal according to claim 1, wherein the light-sensitive device comprises a back-biased photodiode.

3. The light signal receiver according to claim 2, wherein the photodiode is of the PIN type.

4. The light signal receiver according to any one of claims 1-3, wherein the light signals are transmitted to the light-sensitive device by an optical fiber.

5. A light signal receiver comprising:
   a light-sensitive device delivering an electric current in response to detected light signals;
   a preamplifier having a first input which receives the electric current output from the light-sensitive device, the preamplifier comprising:
   at least one input transistor having an emitter connected to said first input of the preamplifier; at least one polarization means connected to a base of the at least one input transistor to impose a fixed potential o this base, the at least one polarization means comprising an amplifier and a negative feedback transistor;
   a collector of the at least one input transistor being connected to a first feed potential by a load resistance;
   the emitter of the at least one input transistor being further connected to a second feed potential by a first emitter resistance; and
   wherein the collector delivers voltage signals as a function of the electric current output from the light-sensitive device.

6. A light signal receiver comprising:
   a light-sensitive device delivering an electric current in response to detected light signals;
   a preamplifier having a first input which receives the electric current output from the light-sensitive device, the preamplifier comprising:
   at least one input transistor having an emitter connected to said first input of the preamplifier;
   at least one polarization means connected to a base of the at least one input transistor to impose a fixed potential o this base, the at least one polarization means comprising an amplifier and a positive input which receives a reference voltage, an output of the amplifier being connected both to the base of the at least one input bipolar transistor and to a base of a negative feedback transistor, an emitter of the negative feedback transistor being connected to a negative input of the amplifier;

a collector of the at least one input transistor being connected to a first feed potential by a load resistance;

the emitter of the at least one input transistor being further connected to a second feed potential by a first emitter resistance; and wherein the collector delivers voltage signals as a function of the electric current output from the light-sensitive device.

7. The light signal according to claim 6, wherein the emitter of the negative feedback transistor is further connected to the second feed potential by a second emitter resistance.

8. The light signal receiver according to claim 7, wherein the first emitter resistance of the at least input bipolar transistor and the second emitter resistance of the negative feedback transistors have the same value.

9. The light signal receiver according to any one of claims 6, 7, 8, wherein the at least one input bipolar transistor and the negative feedback transistor are paired at their bases.

10. A light signal receiver comprising:

a light-sensitive device delivering an electric current in response to detected light signals;

a preamplifier having a first input which receives the electric current output from the light-sensitive device, the preamplifier comprising:

at least one input transistor having an emitter connected to said first input of the preamplifier;

at least one polarization means connected to a base of the at least one input transistor to impose a fixed potential on this base;

a collector of the at least one input transistor being connected to a first feed potential by a load resistance;

the emitter of the at least one input transistor being further connected to a second feed potential by a first emitter resistance; and wherein the collector delivers voltage signals as a function of the electric current output from the light-sensitive device; and a second input connected to an electrode of a second input transistor, the second input transistor being polarized by a second polarization means to impose on a base of the second input transistor a fixed voltage, the light-sensitive device being inserted between the first and second inputs of the preamplifier so that the electric current output by the light-sensitive device is amplified by the preamplifier according to an operation of a differential type.

11. The light signal receiver according to claim 10, wherein the first and second inputs are brought to different potentials.

12. The light signal receiver according to claim 11, wherein the second input transistor and second polarization means form a stage arranged in the same way as the stage formed by the first input transistor and the first polarization means.

13. The light signal receiver according to claim 12, wherein the first polarization means receives a first reference voltage whose value is different from that of a second reference voltage applied to the second polarization means.

14. The light signal receiver according to claim 13, wherein the first and second input transistors have emitter resistances of different values in the same ratio as that of the difference of the fist and second reference voltages.

15. The light signal receiver according to any one of claims 10 to 14, wherein collectors of the first and second input transistors deliver voltage signals in phase opposition.

* * * * *